April 4, 1961  C. P. XENIS  2,977,994
METHOD AND APPARATUS FOR SEALING PIPE JOINTS
Filed Dec. 26, 1957  3 Sheets-Sheet 1
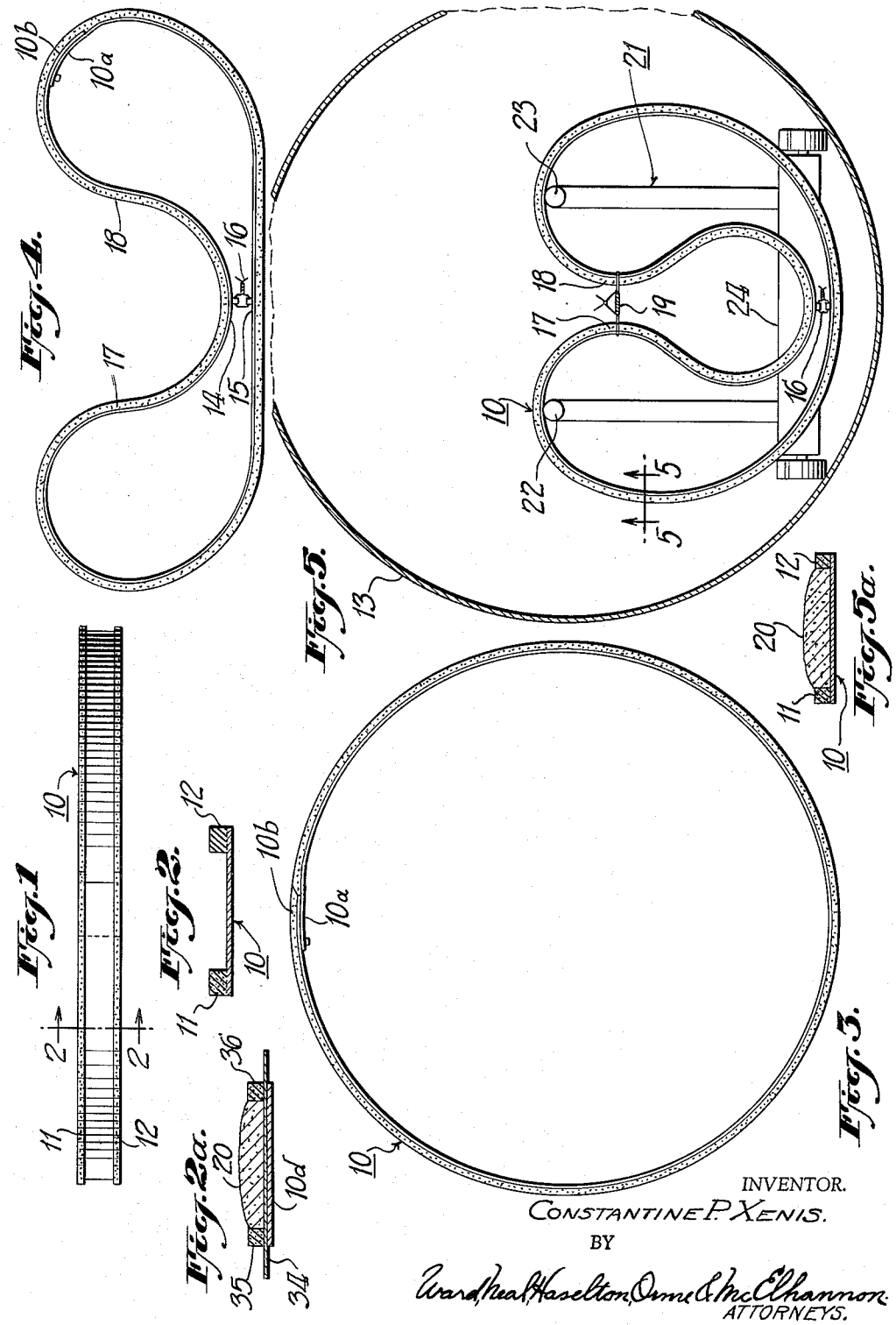
INVENTOR.
CONSTANTINE P. XENIS.
BY
Ward, Neal, Haselton, Orme & McElhannon
ATTORNEYS.

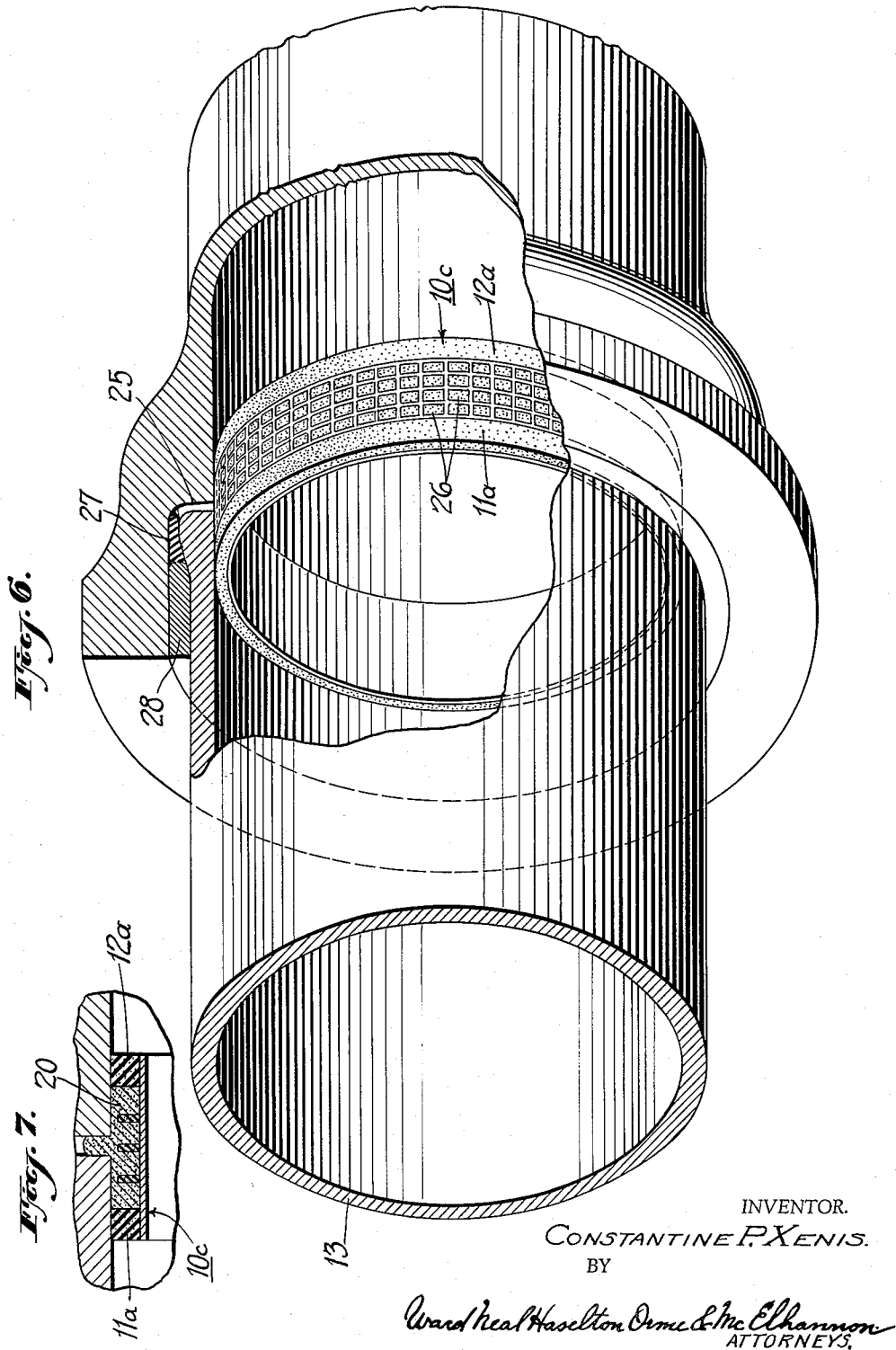

April 4, 1961  C. P. XENIS  2,977,994
METHOD AND APPARATUS FOR SEALING PIPE JOINTS
Filed Dec. 26, 1957  3 Sheets-Sheet 3
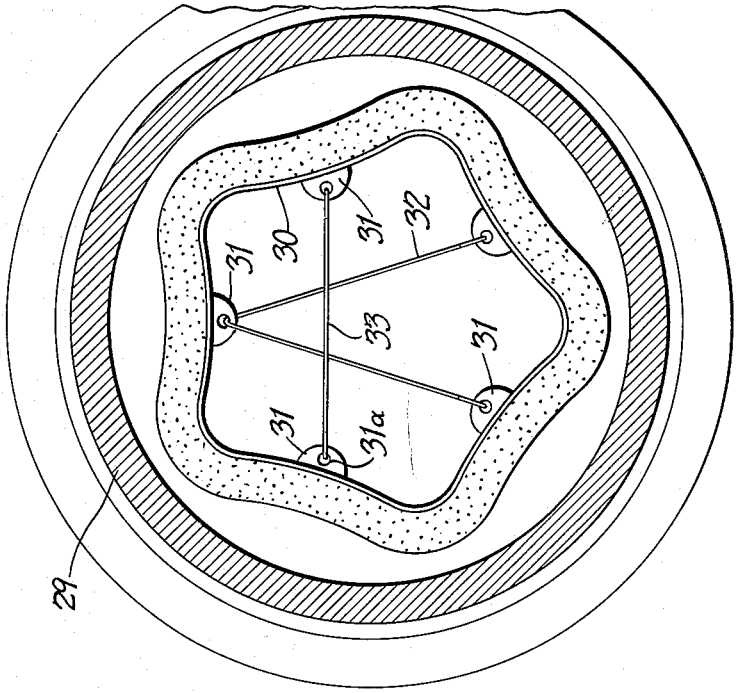
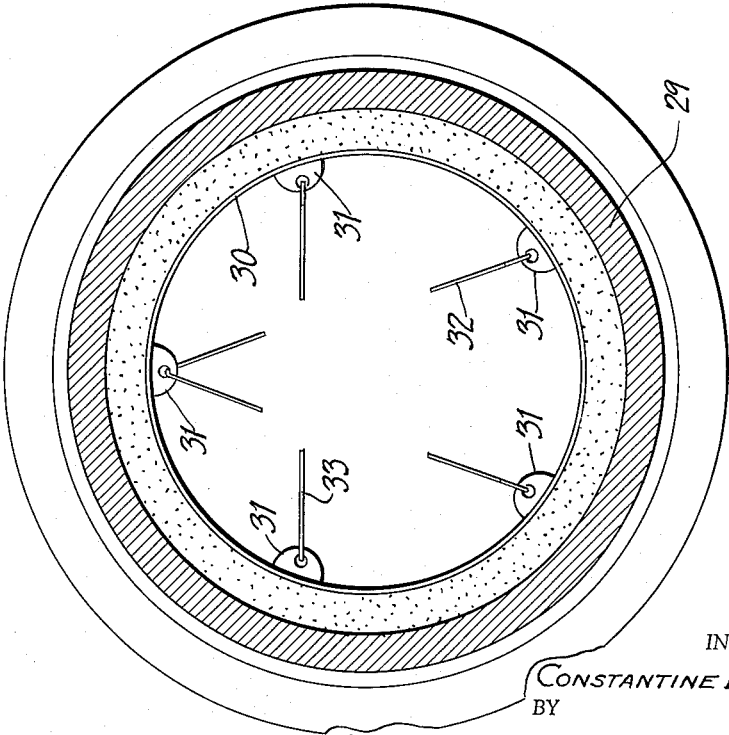
INVENTOR.
CONSTANTINE P. XENIS.
BY
ATTORNEYS.

United States Patent Office 2,977,994
Patented Apr. 4, 1961

2,977,994

METHOD AND APPARATUS FOR SEALING PIPE JOINTS

Constantine P. Xenis, Douglaston, N.Y., assignor to Consolidated Edison Company of New York, Inc., New York, N.Y., a corporation of New York Filed Dec. 26, 1957, Ser. No. 705,204

9 Claims. (Cl. 138—97)

This invention relates to the sealing of pipes, and more particularly to the sealing of pipe joints, the invention being especially useful in the sealing of leaks in gas main systems.

Most of the joints in existing gas main systems are of the bell and spigot variety in which jute inner packing is used, the jute being usually secured in place by a lead outer packing.

In the past deterioration of such jute packing has been minimized because of the moisture contained in the type of gas transported by the mains, namely, "manufactured gas," which moisture has prevented the drying out of the jute. So long as such jute receives adequate moisture from such source, the packing of the joints enjoys a normal life of many years. In recent years, however, natural gas has come into wide use and, due to improvements in pipe-line transportation, is now used in many parts of the country where manufactured gas was previously used. Since natural gas is extremely dry, its use tends to dry out the packing of the pipe joints in the gas mains. In particular, it drys out the jute packing and causes it to become powdery. The drying of the jute packing produces substantial leaks in the pipe joints in a relatively short time. Also, minute shifting or heaving of the earth and vibrations caused by traffic or other causes contribute to the deterioration of the packing of the joints. It is also believed that the motion of gas through the pipe may cause continuous but small vibrations through the pipe which may accelerate deterioration of the jute. It has thus become necessary in areas where natural gas is transported through previously established gas main systems designed for manufactured gas, to take action to prevent the rapid deterioration of the jute packing.

Previous methods of repairing leaks in gas mains, or in treating joints in such pipes to prevent the development of leaks, has involved the expensive operation of excavating around each joint or leak in order to expose the pipe so that suitable sealing operations may be performed on the outside of the pipe. A typical procedure for sealing pipe joints in the past has involved digging an excavation, which may frequently measure as much as five feet by four feet in horizontal area and five or more feet in depth, in order to expose the pipe joint. A pipe joint clamp is applied having well known mechanical means for sealing the mouth of the joint between the outer lip of the bell and the adjacent spigot part of the joint. In some instances the pipe joint may be completely recaulked. Such procedures are extremely expensive in that the entire operation must be repeated at every joint.

One of the objects of the present invention is to provide novel means for sealing pipe joints or leaks in pipes and which overcomes the aforementioned disadvantages.

The invention in one aspect thereof comprises the novel method of releasably holding in a non-annular condition a normally annular sealing ring of resilient, flexible, collapsible material, such as sheet steel, there being sealing material applied to the periphery of such ring, positioning the ring, while held in such non-annular condition, within a pipe joint to be sealed, releasing the ring, and causing same to move into annular shape to press the sealing material against the inner surface of such pipe joint.

Thus according to one embodiment of the present invention a leak or joint in a pipe may be sealed by the use of a resilient, deformable sealing ring. Because of its resilient and deformable nature the sealing ring can be deformed into a non-annular shape. The periphery of the ring is coated with suitable sealing material and the ring in a deformed, non-annular condition is positioned within the pipe at the point at which the pipe is to be sealed. The sealing ring is then caused to return to its undeformed condition whereby the ring presses the sealing material tightly between the ring and the inside of the pipe. The sealing material thus cooperates with the ring in providing an effective seal.

The deformable, resilient sealing ring used in practicing this invention preferably comprises a ring or band of relatively thin, flexible, resilient metal capable of being deformed sufficiently to fit into the pipe easily, such resiliency aiding same to spring back to its original shape in order to press tightly against the inside circumference of the pipe. A circular band of thin spring steel is for instance suitable for this purpose.

A sealing ring of the above type is preferably provided on its outer surface with means for assisting in retaining a desired thickness of sealing material on the outer surface of the sealing ring. A sealing material which can be successfully used is described in greater detail below. It is generally a plastic material which is initially sufficiently soft to be applied easily to the sealing ring and then cures or sets into a more hardened condition after the sealing of the joint is completed. The desired properties of the sealing material are: that it be a highly viscous liquid or plastic (which will not flow off the sealing ring after it has been applied thereto) at the time of application, that it be able to set to a firm state without shrinkage, that it have adhesion to steel or iron, and that it be impervious to natural gas or related petroleum products. Suitable means may be used as an aid in retaining such sealing material on the outer surface of the sealing ring. Peripheral beads or ridges, as of sponge rubber, on the outer surface of the sealing ring are desirable for this purpose. Such ridges or beads preferably are located along the opposite peripheral edges of the sealing ring.

The sealing ring in its annular undeformed condition should have a circumference only slightly smaller than the internal circumference of the pipe at the place to be sealed. The external circumference of the sealing ring should be less than the internal circumference of the pipe in order to allow the sealing ring to return completely to its undeformed condition. The external circumference of the sealing ring after it has been coated with the sealing material and has been allowed to return to its undeformed condition should be greater than the internal circumference of the pipe in order to insure that an adequate seal is effected. Since the sealing ring is placed in position and allowed or caused to return to its undeformed condition while the sealing material is still relatively soft and uncured, the excess sealing material is readily displaced and is squeezed out between the sealing ring and the inside of the pipe. The sealing material remaining between the sealing ring and the inside of the pipe is thus forced against the pipe under pressure and tends effectively to seal any leaks. The sealing material then cures or sets to produce a permanent seal. The sealing ring in its undeformed condition prior to the addition of the sealing material may have an external diameter, for example, between about 0.25 to about 1 inch less than the internal diameter of the pipe. The sealing material is preferably placed on the outside of the sealing ring in a layer of suitable thickness. The use of soft edge beads or ridges, as described above, facilitates the positioning of the desired amount of sealing material on the sealing ring.

The expansion of the sealing ring to its undeformed condition within the pipe applies the sealing material to the internal surface of the pipe conforming to all the irregularities of such surface. In addition to the plasticity necessary to accomplish this result the sealing material should become firm but resilient thereby to withstand the internal gas pressures at all times, and also to form a seal which will withstand the effect of vibration or slight movement of the pipe. The sealing material is preferably thixotropic. Adhesion to the metal surface of the pipe, while not essential to the formation of a good seal since the internal pressure of the gas maintains a seal, is highly desirable in obtaining an effective seal.

The preferred sealing material for use with this invention comprises a polysulfide rubber formed by mixing liquid mercaptan terminated polysulfide polymer with a catalyst such as lead peroxide to form an adhesive plastic which cures in a relatively short time after mixing. Such materials are generally known as Thiokols and are relatively thixotropic. The viscosity of mercaptan terminated polysulfide polymers may be lowered considerably by agitation in order to increase the ease of applying the sealing material to the sealing ring. Due to the thixotropic nature of such material, agitation does not affect to an undesired degree the ability of the material to hold its shape once it is applied to the sealing ring. Such a sealing material cures within a day or two (e.g. 48 hours at 70° to 80° F.) to form a resilient rubber-like material having ample mechanical strength to withstand the internal gas pressures to which it is subjected.

The sealing ring, such as that described above, may be deformed in any manner which reduces the effective circumference thereof and the applied sealing material to less than the internal circumference of the pipe. By effective circumference is meant the circumference of the circle which would be required to contain the periphery of the sealing ring in its deformed condition after it has been coated with sealing material. The sealing ring can, for instance, be deformed by deforming the periphery of the ring inwardly at one or more points and securing the ring in such deformed position by the use of wires or tie rods. Such wires or tie rods can then be released when the ring is in place to allow the ring to return to its normal, undeformed condition.

A preferred sealing ring comprises a thin band of spring steel equipped on its outer surface with sponge rubber edge beads to aid in positioning the sealing material. A preferred method of deforming such a sealing ring comprises bringing two opposite points of the ring together or nearly together and securing them with wire. The ends of the cross-section thus formed are then brought together as nearly as possible and secured with wire. In this configuration the sealing ring has an effective circumference much less than its original circumference and can easily be inserted into the pipe. Once in position the wires can be released to allow the sealing ring to return to its original shape and press against the inside of the pipe along its entire circumference. The releasing of the wires is preferably controlled so that the return of the sealing ring to its undeformed condition is gradual. The sealing ring is, of course, coated with sealing material prior to being released to its original shape so that an effective seal is formed.

The deformed sealing means may be inserted into the pipe by any suitable means. The means to be employed will usually depend on factors such as: the size of the pipe, the distance to the point of use of the ring, and the presence or absence of corrosive or harmful substances in the pipe. If, for instance, the pipe is a large one of 48 inch inner diameter, it may be desirable to place the sealing ring by mounting same on a dolly which is moved into the desired position. If the pipe is too small to allow workmen to enter it, the sealing ring may be pushed into the pipe with push rods and may be mounted on any suitable transporting and releasing mechanism and where required means for urging the ring against the inner surface of the joint.

When the sealing ring is being positioned by the use of remotely controlled devices and without the aid of a human inside the pipe, any suitable means may be used for locating the joint at which it is desired to utilize the sealing means. Such means may include a small television camera inserted in the pipe for the purpose of observing the location of the joint. Such means may also include electrical sensing means for sensing the location of the pipe joint by sensing a change in the electromagnetic characteristics of the pipe at the joint, e.g. due to increased mass.

In some instances the interior surface of the pipe at the point to be sealed may be contaminated with dirt, gum, or other substances which might interfere with obtaining a proper seal. In such cases it is within the scope of this invention to remove any such contaminating substances by any suitable means prior to applying the seal. Such deposits might, for instance, be removed by mechanical devices such as revolving wire brushes or might be removed by suitable chemical solvents, etc.

Although the present invention finds its most frequent application in the sealing of pipe joints, it is within the scope of the invention to use the method and apparatus disclosed herein for sealing fissures or cracks occurring in the pipe between the joints.

Various, further and more specific objects, features and advantages of the invention will appear from the description taken in connection with the accompanying drawings which form a part of this specification and illustrate, by way of example, embodiments of such invention. The invention consists in such novel features and combinations of parts as may be shown and described in connection with the method and apparatus herein disclosed.

In the drawings:

Fig. 1 is a side view of a band suitable for use as a sealing ring in accordance with the invention;

Fig. 2 is a sectional view of the band shown in Fig. 1 taken substantially along the line 2—2 of Fig. 1;

Fig. 2a is a sectional view of a modification of the construction shown in Fig. 2;

Fig. 3 is a plan view of the ring of Fig. 1;

Fig. 4 is a view showing the first step in deforming the sealing ring shown in Fig. 3;

Fig. 5 shows the sealing ring of Fig. 4 further deformed and positioned in a pipe;

Fig. 5a is a sectional view taken on line 5—5 of Fig. 5;

Fig. 6 is a perspective view of the sealing ring shown in Fig. 5 following its release from the deformed condition and in position to seal a joint of a pipe;

Fig. 7 is a sectional view showing in greater detail the sealing of a pipe joint as shown in Fig. 6;

Fig. 8 is a vertical sectional view showing another method of deforming the sealing ring of Fig. 3; and Fig. 9 is a vertical sectional view showing the sealing ring illustrated in Fig. 8 following its release from the deformed condition.

Referring to Figs. 1, 2 and 3, a sealing ring 10 suitable for sealing a pipe joint in accordance with this invention, comprises a band of sheet spring steel having soft sponge rubber edge beads 11 and 12 secured along the opposite margins of the periphery thereof. As shown in Fig. 3, the sealing ring 10 is held in ring form by securing together overlapping extremities 10a, 10b.

The first step in deforming the sealing ring 10 for insertion into a pipe, such as 13 (Fig. 5), a joint of which is to be sealed, is to bring close to one another opposite facing inner areas 14, 15 (Fig. 4) of the sealing ring and to hold same as in Fig. 4 by means of a wire loop 16. The ring 10 is then further deformed by bringing towards one another into close but spaced relation the opposite areas 17, 18 (Figs. 4 and 5), and holding such areas in this relation as by a wire loop 19. When the sealing ring has been deformed into the shape shown in Fig. 5, it is coated on its outer surface with a layer 20 of sealing material (Fig. 5a) which is in a plastic condition. The sealing material is smeared over the entire outer surface of the sealing ring 10. The soft rubber edge beads 11 and 12 aid in obtaining the desired thickness of sealing material on the outer surface of such sealing ring 10.

After the sealing ring 10 has been deformed into the shape shown in Fig. 5 and coated with the layer 20 of sealing material, it is placed in position in the interior of the pipe 13 as shown in Fig. 5, for example, with the aid of a supporting structure 21 having arms 22 and 23 which are mounted upon a dolly 24.

When the sealing ring 10 has been properly positioned in pipe 13 in the region of a joint 25 (Fig. 6), where it is desired to effect a seal, the wires 16 and 19 are released or cut and the ring 10 is caused to resume its normal shape, the normal shape, of course, being a circle (Fig. 3). The sealing ring has a circumference in its undeformed condition only slightly less than the internal circumference of the pipe 13. With the addition of the layer of sealing material, the outer circumference of the sealing ring 10 becomes greater than the internal circumference of the pipe 13. When the wires 16 and 19 are released or cut, the sealing ring 10, due to its resilient and flexible material tends to resume such normal shape. When the ring 10 reaches its undeformed condition, it presses the sealing material forcefully against the interior of pipe 13. The edge beads 11 and 12, of sponge rubber or the like being soft and yieldable, do not interfere with the formation of a tight seal by the sealing material. Excess sealing material is squeezed out. As the sealing material cures or hardens it becomes less soft and plastic and preferably becomes a resilient rubber-like solid. In this way a seal is obtained which can successfully accommodate earth vibrations.

In Figs. 6 and 7 a modified sealing ring 10c is employed which is similar to ring 10 except that there is located between edge beads 11a and 12a thereof a waffle-like pattern of sponge rubber-like partitions 26. The latter aid in holding the sealing material 20 to the ring 10c. The sealing rings 10 and 10c force the sealing material against the inside of the joint 25 throughout the entire circumference of the pipe. Fig. 6 also shows the conventional joint packing including jute 27 and lead 28, neither of which is disturbed by the use of the sealing ring 10 as described above.

Figs. 8 and 9 illustrate another method of deforming a sealing ring for insertion into a pipe 29 in accordance with the invention. A sealing ring 30 is employed which is similar to sealing ring 10 described above. As shown in Fig. 8, lugs such as 31 are secured to the inner surface of sealing ring 30. Such lugs are provided with holes 31a through which wires, such as 32 and 33, are passed in order to hold the sealing ring 30 in the deformed state shown (Fig. 8). In the latter deformed condition the ring 30 is easily inserted in the pipe 29. When the ring 30, coated with said sealing material 20, is positioned within the pipe 29 (as by a dolly not shown), and in position to spring out to cover the inside of a pipe joint, the wires 32 and 33 are cut and the ring caused to return to its undeformed circular shape thereby pressing the sealing material against the interior of the pipe (Fig. 9) and establishing an effective seal.

Referring now to Fig. 2a, a modification of the construction shown in Fig. 2 is shown which permits reuse of the steel band per se, such as band 10d, alone and separated from its soft edge beads, this being accomplished by virtue of the interposition of a shield layer of flexible sheet material 34 between such band 10d and the remainder of the construction, namely, the edge beads 35 and 36 which are respectively analogous to the edge beads 11 and 12 of Fig. 2.

Such shield layer 34 preferably is of paper impregnated with a suitable resin or plastic, for example, an epoxy plastic. Alternatively, the layer 34 may consist of a cloth of glass fibres. Any suitable sheet material can be employed providing it can suitably separate the metal band 10d from the remainder of the structure thereby to permit the detachment of the band 10d from the seal after the latter has been made in accordance with the present invention, thus to permit reuse of such band. The layer 34 preferably extends beyond the edges of the band 10d (as viewed in Fig. 2a) by a suitable distance to aid in keeping the band clean, that is, preventing the fouling of such band by the sealing material 20.

The invention embodying Fig. 2a is desirable because of the substantial expense of each of the bands 10d which are not absolutely necessary to the maintenance of a seal once the sealing material has been suitably urged against the inside of a pipe joint in the manner above described.

One example of the sealing material which has been found suitable for use in the present invention is that manufactured by the Minnesota Mining and Manufacturing Company comprising a member of the Thiokol family of sealants sold under the designation "EC–801." Also there can be employed a Thiokol modified epoxy resin compound manufactured and sold by said company under the designation "EC–1472" employing a catalyst designated "EC–1473." The latter two substances are two basic types of compounds which afford the desired properties of being highly viscous liquid or plastic at the time of application, of later setting to a firm state without shrinkage, of providing an aggressive adhesion to steel or cast iron, and of resisting any deleterious effects of the ingredients of natural gas or related petroleum products. The above enumerated compounds EC–801, EC–1472 and EC–1473 are based primarily upon Thiokol polysulfide liquid polymers with suitable reinforcing and viscosity controlling pigments. They employ lead peroxide type catalyst to effect their cure.

Other compounds which may be employed in the present invention and which also are manufactured by the aforementioned Minnesota Mining and Manufacturing Company are designated by the latter as follows:

EC–776 which is an adhesive or coating material based primarily upon nitrile rubber modified with thermosetting resins;

EC–776R which is a variation of the latter and which contains a selected amount of pigment.

A further sealant manufactured by the above-designated company which may be employed also is designated EC–1477 which is polymerized by a catalyst EC–1478. Thus the sealant comprises a two-part compound or composition, the parts being designated by the two numbers last mentioned. The compound or composition is polymerized without any external heat applied thereto.

The aforementioned polysulfide rubber has characteristics which typify a desirable sealing substance. For example, the following characteristics thereof are:

Zero inches of flow as measured on a Boeing flow test jig meeting U.S. Air Force specification 7502A; and viscosity: a range of 40°–60° as measured on a viscosimeter of the McMichael type employing a No. 18 wire. Also, the sealant should be non-sag and flexible.

In one form of the invention the elements thereof comprise:

(1) The sealing ring above described to which is applied the sealant;

(2) Transporting means for the sealing ring which can include the aforementioned dolly or cart 24 which is pushed in a large pipe by hand to the location of the joint, or the dolly may be pushed by a succession of rods if the pipe is too small to admit a human. Alternatively, the transporting means can comprise a duct crawler apparatus as disclosed in my co-pending U.S. application Serial No. 581,630, now Patent No. 2,917,762, entitled "Apparatus for Travelling Through Pipes";

(3) A pipe joint locater which includes means for sensing changes in electromagnetic characteristics of the pipe caused by a change of pipe mass at the pipe joint; or alternatively the pipe joint locater may comprise a TV camera system including a small TV camera having a lens tilted axially relative to the longitudinal axis of the pipe in such a manner that it can detect the position of a joint when the distorted sealing ring is in proper position to be released inside the pipe for sealing such joint;

(4) Means for supporting the sealing ring in distorted condition, such supporting means being movable by the aforementioned transporting means;

(5) Means for releasing the sealing band from its collapsed or deformed condition, such means being remotely controllable.

While the invention has been described in detail with respect to a preferred embodiment, it will be understood by those skilled in the art that various changes and modifications may be made without departing from the spirit and scope of the invention, and it is intended to cover all such changes and modifications in the appended claims.

What is claimed is:

1. In apparatus of the class described, a resilient, flexible, collapsible sealing ring normally of annular configuration which is adapted to be releasably held in a non-annular collapsed condition, sealing material being applied to the periphery of said sealing ring, means for transporting such sealing ring to a selected location within a pipe adjacent the region of a leak in said pipe which is to be sealed, means for so releasably holding said sealing ring in such non-annular collapsed condition, such latter means being releasable to allow the sealing ring to assume its normal annular configuration to press the sealing material against the inner surface of the pipe over said leak.

2. Apparatus as set forth in claim 1 wherein the sealing material is a plastic material having a low viscosity at the time of its application to the sealing ring and adapted to cure subsequently to form a resilient, rubber-like material.

3. Apparatus as set forth in claim 1 wherein the sealing material comprises a mercaptan terminated, polysulfide polymer mixed with a catalyst comprising lead peroxide.

4. In apparatus of the class described, a sealing ring of resilient, flexible, collapsible sheet material of normally annular configuration which is adapted to be releasably held in a non-annular deformed condition, there being applied to the periphery of such sealing ring a sealant material, means for so releasably holding said sealing ring in such non-annular deformed condition, means for supporting the sealing ring in such non-annular deformed condition, transporting means mounting said supporting means for moving the sealing ring within a pipe, pipe joint locating means for detecting the position of the pipe joint and positioning said transporting means and hence said sealing ring supporting means whereby said sealing ring is located within the pipe with the periphery of the sealing ring facing the inner surfaces of the pipe joint preparatory to assuming its normal annular configuration, such means holding said ring in deformed condition being releasable to allow the ring to resume its normal annular configuration thereby to press the sealing material against the inner surface of the pipe joint.

5. A method for sealing a leak in a pipe which comprises advancing into the pipe to the location of the leak a flexible, resilient, deformable sealing member having applied to its outer surface a sealing material, which sealing member normally assumes a ring shape conforming to the interior wall of the pipe, but which as it is advanced into the pipe is inwardly deformed from its normal ring shape to provide clearance permitting the member readily to be moved to the desired position, releasing said sealing member from its deformed condition and allowing the same to return to its normal ring shape whereby the sealing material on its outer surface is urged against the interior of the pipe covering said leak.

6. The method for sealing a leak in a pipe which comprises deforming a resilient, flexible sealing ring into a deformed non-annular condition, the periphery of said ring bearing a plastic sealing material, positioning said deformed ring with the sealing material thereon within the pipe at the location of the leak and then releasing said ring from its deformed condition whereby the sealing material is urged against the interior of the pipe by said ring and covers said leak.

7. The method for sealing a pipe joint which comprises deforming a resilient, flexible sealing ring into a deformed, non-annular condition, the periphery of said ring bearing a plastic sealing material, positioning said deformed ring with the sealing material thereon within the pipe at the location of said joint, and then releasing said ring from its deformed condition whereby the sealing material is urged against the inner surface of said pipe joint.

8. The method for sealing a leak in a pipe which comprises deforming a resilient, deformable sealing ring into a non-annular condition, applying a sealing material to the periphery of said deformed ring, positioning said deformed ring within said pipe at the location of the leak, and then releasing said ring from its deformed condition whereby said sealing material is urged against the interior of said pipe by said ring and covers said leak.

9. The method for sealing a leak in a pipe which comprises applying a sealing material to the periphery of a resilient, deformable sealing ring, deforming said ring into a non-annular condition, positioning said deformed ring within said pipe at the location of said leak, and then causing said ring to return to its undeformed condition whereby the sealing material is urged against the interior of the pipe by said ring and covers said leak.

References Cited in the file of this patent

UNITED STATES PATENTS

| | | |
|---|---|---|
| 2,014,313 | Damsel | Sept. 10, 1935 |
| 2,312,993 | Stephens | Mar. 2, 1943 |
| 2,338,674 | Smith | Jan. 4, 1944 |
| 2,518,142 | Huntington | Aug. 8, 1950 |